US012515689B2

(12) United States Patent
Toda et al.

(10) Patent No.: US 12,515,689 B2
(45) Date of Patent: *Jan. 6, 2026

(54) DRIVING ASSISTANCE DEVICE, DRIVING ASSISTANCE METHOD, AND STORAGE MEDIUM

(71) Applicant: HONDA MOTOR CO., LTD., Tokyo (JP)

(72) Inventors: Kosuke Toda, Wako (JP); Yuji Yasui, Wako (JP); Takeru Goto, Wako (JP); Aya Miura, Wako (JP); Kenjiro Torii, Wako (JP); Keming Ding, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 166 days.

This patent is subject to a terminal disclaimer.

(21) Appl. No.: 18/373,302

(22) Filed: Sep. 27, 2023

(65) Prior Publication Data
US 2024/0109552 A1  Apr. 4, 2024

(30) Foreign Application Priority Data

Sep. 30, 2022 (JP) ................. 2022-158020

(51) Int. Cl.
*B60W 50/14* (2020.01)
*B60W 30/18* (2012.01)
(Continued)

(52) U.S. Cl.
CPC ...... *B60W 50/14* (2013.01); *B60W 30/18163* (2013.01); *B60W 40/105* (2013.01);
(Continued)

(58) Field of Classification Search
CPC ........... B60W 50/14; B60W 30/18163; B60W 40/105; B60W 50/0097; B60W 2050/0083; B60W 2050/143; G06F 3/165
See application file for complete search history.

(56) References Cited

U.S. PATENT DOCUMENTS 8,248,223 B2  8/2012 Periwal
8,483,949 B2  7/2013 Taguchi et al.
(Continued)

FOREIGN PATENT DOCUMENTS

CN  105460014  4/2016
CN  110097785  8/2019
(Continued)

OTHER PUBLICATIONS

U.S. Notice of Allowance for U.S. Appl. No. 18/202,391 dated Mar. 13, 2025.

(Continued)

*Primary Examiner* — Chico A Foxx

(74) *Attorney, Agent, or Firm* — Amin, Turocy & Watson, LLP

(57) ABSTRACT

Provided is a mobile object control device configured to: recognize a surrounding situation of a mobile object; set, based on the recognized surrounding situation, a risk area in which positions of the surrounding situation are associated with risk values that are indicator values indicating degrees to which the mobile object is to avoid traveling; generate a target trajectory indicating a route along which the mobile object is to travel in the future; cause the mobile object to travel along the generated target trajectory; and set at least one observation point in each of three or more provisional trajectories branching at a specific location ahead of the mobile object, and generate the target trajectory based on the risk area and the at least one observation point.

13 Claims, 8 Drawing Sheets

(51) Int. Cl.
  *B60W 40/105* (2012.01)
  *B60W 50/00* (2006.01)
  *G06F 3/16* (2006.01)
(52) U.S. Cl.
  CPC ......... *B60W 50/0097* (2013.01); *G06F 3/165* (2013.01); *B60W 2050/0083* (2013.01); *B60W 2050/143* (2013.01)

(56) References Cited

U.S. PATENT DOCUMENTS

| | | | | |
|---|---|---|---|---|
| 8,583,329 | B2 * | 11/2013 | Breed | B60R 21/0134 |
| | | | | 180/197 |
| 10,843,710 | B2 | 11/2020 | Seo et al. | |
| 10,921,804 | B2 * | 2/2021 | Okimoto | B60W 30/12 |
| 10,953,875 | B2 * | 3/2021 | Prakah-Asante | |
| | | | | B60W 30/0953 |
| 2002/0140562 | A1 | 10/2002 | Gutta et al. | |
| 2007/0032943 | A1 | 2/2007 | Okabe | |
| 2008/0119993 | A1 | 5/2008 | Breed | |
| 2009/0088925 | A1 | 4/2009 | Sugawara et al. | |
| 2010/0045451 | A1 | 2/2010 | Periwal | |
| 2013/0250112 | A1 * | 9/2013 | Breed | G01S 17/931 |
| | | | | 348/148 |
| 2016/0016513 | A1 | 1/2016 | Di Censo et al. | |
| 2016/0091896 | A1 | 3/2016 | Maruyama | |
| 2016/0094928 | A1 | 3/2016 | Shiozawa et al. | |
| 2016/0236681 | A1 | 8/2016 | Nguyen van et al. | |
| 2016/0272204 | A1 | 9/2016 | Takahashi et al. | |
| 2017/0129501 | A1 * | 5/2017 | Lee | B60W 30/16 |
| 2018/0111551 | A1 | 4/2018 | Suzuki et al. | |
| 2019/0037298 | A1 * | 1/2019 | Reily | H04R 1/1041 |
| 2019/0179330 | A1 | 6/2019 | Oniwa et al. | |
| 2019/0283671 | A1 | 9/2019 | Shimomura et al. | |
| 2019/0378040 | A1 * | 12/2019 | Ali | G01S 17/931 |
| 2020/0402401 | A1 * | 12/2020 | Takamura | G06F 3/167 |
| 2021/0019108 | A1 * | 1/2021 | Smith | H04S 7/304 |
| 2021/0323570 | A1 * | 10/2021 | Yasui | B60W 30/18163 |
| 2023/0394989 | A1 * | 12/2023 | Hill | G09B 19/16 |

FOREIGN PATENT DOCUMENTS

| | | | | |
|---|---|---|---|---|
| DE | 102005022663 | A1 * | 11/2006 | ............ B60W 50/14 |
| EP | 2980547 | A1 * | 2/2016 | ............ G01H 17/00 |
| JP | 2001010372 | A * | 1/2001 | ......... B60K 31/0008 |
| JP | 2005-053401 | | 3/2005 | |
| JP | 2006-244142 | | 9/2006 | |
| JP | 2007-042003 | | 2/2007 | |
| JP | 2007-133486 | | 5/2007 | |
| JP | 2016-020203 | | 2/2016 | |
| JP | 2018-067198 | | 4/2018 | |
| JP | 2019-158935 | | 9/2019 | |
| JP | 2019-199179 | | 11/2019 | |
| JP | 2021-033570 | | 3/2021 | |
| JP | 2021-077141 | | 5/2021 | |
| JP | 2021-174505 | | 11/2021 | |
| JP | 2022170271 | A * | 11/2022 | |
| JP | 7600825 | B2 * | 12/2024 | ............... B60Q 9/00 |
| WO | 2014/174840 | | 10/2014 | |
| WO | 2021/216768 | | 10/2021 | |

OTHER PUBLICATIONS

Japanese Office Action for Japanese Patent Application No. 2022-087539 mailed Jul. 29, 2025.
Non-Final Office Action for U.S. Appl. No. 17/225,297 dated Nov. 25, 2022.
Non-Final Office Action for U.S. Appl. No. 17/225,297 dated Apr. 27, 2023.
Chinese Office Action for Chinese Patent Application No. 202110415904.0 mailed Jun. 30, 2023.
Non-Final Office Action for U.S. Appl. No. 18/125,770 dated Aug. 31, 2023.
Japanese Office Action for Japanese Patent Application No. 2020-171974 mailed Oct. 24, 2023.
Japanese Office Action for Japanese Patent Application No. 2022-158020 dated Aug. 26, 2025.

* cited by examiner

182

| SCENE TYPE | NOTIFICATION TYPE | NOTIFICATION SOUND INFORMATION |
|---|---|---|
| DURING MERGING (DURING TRAVELING IN MERGING SEGMENT) | ACCELERATION | * * * |
| | DECELERATION | * * * |
| | MAINTENANCE OF CURRENT STATE (OK NOTIFICATION) | * * * |
| DURING TRAVELING IN STRIGHT ROAD SEGMENT | ACCELERATION | * * * |
| | DECELERATION | * * * |
| | MAINTENANCE OF CURRENT STATE (OK NOTIFICATION) | * * * |
| ... | ... | ... |

<ACCELERATION GUIDANCE NOTIFICATION SOUND>

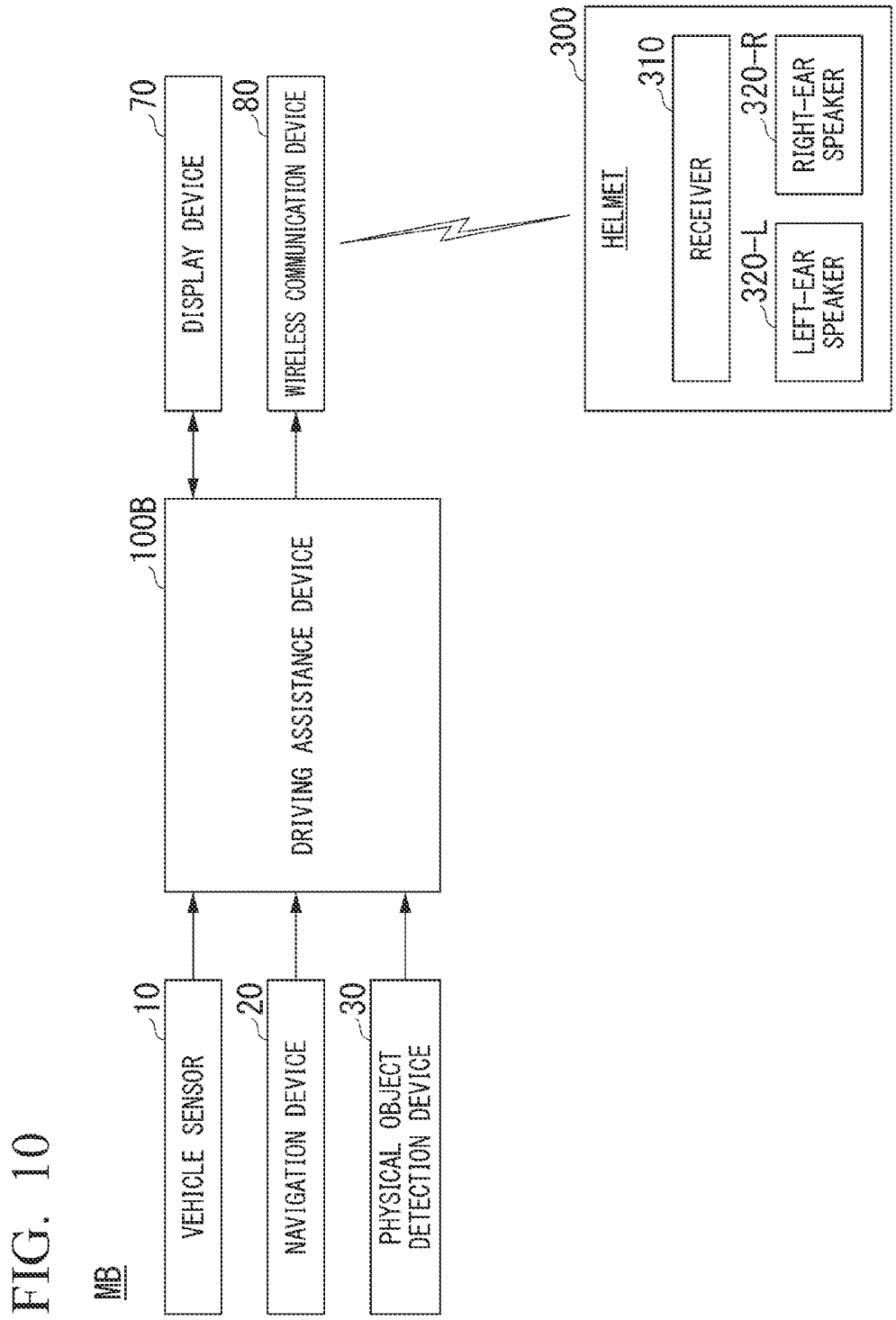

DRIVING ASSISTANCE DEVICE, DRIVING ASSISTANCE METHOD, AND STORAGE MEDIUM

CROSS-REFERENCE TO RELATED APPLICATION

Priority is claimed on Japanese Patent Application No. 2022-158020, filed Sep. 30, 2022, the content of which is incorporated herein by reference.

BACKGROUND

Field of the Invention

The present invention relates to a driving assistance device, a driving assistance method, and a storage medium.

Description of Related Art

In recent years, efforts to provide access to sustainable transportation systems that take into account vulnerable groups among traffic participants have become active. To implement these, research and development for further improving traffic safety and convenience through research and development related to navigation technology are being focused on. In relation to this, technology for allowing occupants of a vehicle to identify notification information (an information presentation, alert, or alarm) through an information expression sound is disclosed (for example, Japanese Unexamined Patent Application, First Publication No. 2019-158935).

SUMMARY

Meanwhile, in the driving assistance technology, the provision of a sound for guiding the occupant to drive appropriately with respect to various differences in surrounding situations of the mobile object has not been considered. Therefore, there is a problem that appropriate driving assistance is unlikely to be provided to the occupants.

In order to solve the above problems, an objective of the present application is to provide a driving assistance device, a driving assistance method, and a storage medium capable of providing more appropriate driving assistance through a sound notification according to a surrounding situation. In turn, it will contribute to the development of a sustainable transportation system.

A driving assistance device, a driving assistance method, and a storage medium according to the present invention adopt the following structures.

(1): According to an aspect of the present invention, there is provided a driving assistance device including: a recognizer configured to recognize a surrounding situation of a mobile object; a decider configured to decide whether or not to prompt a driver of the mobile object to perform acceleration or deceleration on the basis of the surrounding situation; and a notification controller configured to cause a speaker to output a notification sound for prompting the driver of the mobile object to perform the acceleration or deceleration on the basis of a decision result, wherein the notification sound is a notification sound obtained by continuously changing a structure of a sound.

(2): In the above-described aspect (1), the notification controller causes the speaker to output notification sounds obtained by differentiating a structure of a continuously changing sound when the mobile object is accelerated and when the mobile object is decelerated.

(3): In the above-described aspect (1), the notification controller causes the speaker to output a notification sound having a structure in which a frequency or pitch of a sound is continuously changed greatly or slightly.

(4): In the above-described aspect (3), the notification controller changes the frequency or pitch in accordance with a degree of deviation between a speed of the mobile object and a target speed.

(5): In the above-described aspect (3), the notification controller changes a period of the notification sound to be iteratively output in accordance with a degree of deviation between a speed of the mobile object and a target speed.

(6): In the above-described aspect (1), a plurality of speakers are provided in the mobile object, and the notification controller controls output processes of the plurality of speakers so that a sound image of the notification sound moves from the rear to the front of the driver or from the front to the rear of the driver in accordance with a case where the mobile object is accelerated and a case where the mobile object is decelerated.

(7): In the above-described aspect (1), the notification controller causes the speaker to output the notification sound when a difference between a speed of the mobile object and a target speed is greater than or equal to a threshold value, and determines whether or not to continuously output the notification sound in accordance with the surrounding situation of the mobile object when the difference between the speed of the mobile object and the target speed is less than the threshold value.

(8): In the above-described aspect (7), the notification controller causes the notification sound to be continuously output even if the difference between the speed of the mobile object and the target speed is less than the threshold value when the mobile object is traveling in a specific road segment where the speed of the mobile object is predicted to change.

(9): In the above-described aspect (8), the specific road segment includes a merging segment, and the notification controller ends an output of the notification sound when the mobile object has completed merging from a merging lane in the merging segment into a main lane.

(10): In the above-described aspect (8), the notification controller ends an output of the notification sound when the difference between the speed of the mobile object and the target speed is less than the threshold value and when the mobile object is not traveling in the specific road segment.

(11): In the above-described aspect (7), the notification controller causes the speaker to output a notification sound different from the notification sound when the difference between the speed of the mobile object and the target speed is less than the threshold value after the notification sound is output.

(12): In the above-described aspect (7), the notification controller determines whether or not to end the notification sound on the basis of content set by the driver when the difference between the speed of the mobile object and the target speed is less than the threshold value in a state in which the notification sound has been output.

(13): In the above-described aspect (7), the notification controller causes the output of the notification sound to end by receiving an end instruction from the driver when the difference between the speed of the mobile object and the target speed is less than the threshold value in a state in which the notification sound has been output.

(14): In the above-described aspect (7), the driving assistance device further includes a learner configured to learn a notification sound for providing a notification to the driver on the basis of a change degree of traveling of the mobile object after the notification sound is output, wherein the notification controller causes the speaker to output the notification sound learned by the learner in advance and associated with the driver when the difference between the speed of the mobile object and the target speed is less than the threshold value in a state in which the notification sound has been output.

(15): According to another aspect of the present invention, there is provided a driving assistance method including: recognizing, by a computer, a surrounding situation of a mobile object; deciding, by the computer, whether or not to prompt a driver of the mobile object to perform acceleration or deceleration on the basis of the recognized surrounding situation; and causing, by the computer, a speaker to output a notification sound for prompting the driver of the mobile object to perform the acceleration or deceleration on the basis of a decision result, wherein the notification sound is a notification sound obtained by continuously changing a structure of a sound.

(16): According to yet another aspect of the present invention, there is provided a computer-readable non-transitory storage medium storing a program for causing a computer to: recognize a surrounding situation of a mobile object; decide whether or not to prompt a driver of the mobile object to perform acceleration or deceleration on the basis of the recognized surrounding situation; and cause a speaker to output a notification sound for prompting the driver of the mobile object to perform the acceleration or deceleration on the basis of a decision result, wherein the notification sound is a notification sound obtained by continuously changing a structure of a sound.

According to the above-described aspects (1) to (16), it is possible to provide more appropriate driving assistance through a notification of a sound corresponding to a surrounding situation.

BRIEF DESCRIPTION OF THE DRAWINGS

FIG. 10 is a diagram showing a device mounted in a two-wheeled vehicle MB centered on a driving assistance device according to a third embodiment.

DESCRIPTION OF EMBODIMENTS

Hereinafter, embodiments of a driving assistance device, a driving assistance method, and a storage medium according to the present invention will be described with reference to the drawings. The driving assistance device is a device that supports driving of a mobile object. The mobile object may include a vehicle of three or four wheels or the like, a two-wheeled vehicle, a micro-mobility, and the like, and may include any mobile object boarded by a person (a driver). In the first embodiment and the second embodiment to be described below, it is assumed that the mobile object is a four-wheeled vehicle. In the third embodiment, it is assumed that the mobile object is a two-wheeled vehicle. Hereinafter, a vehicle equipped with a driving assistance device is referred to as a "vehicle M." Although a case in which left-hand traffic regulations are applied will be described below, it is only necessary to reverse the left and right when right-hand traffic regulations are applied.

First Embodiment

[Structure]

Figure 1:
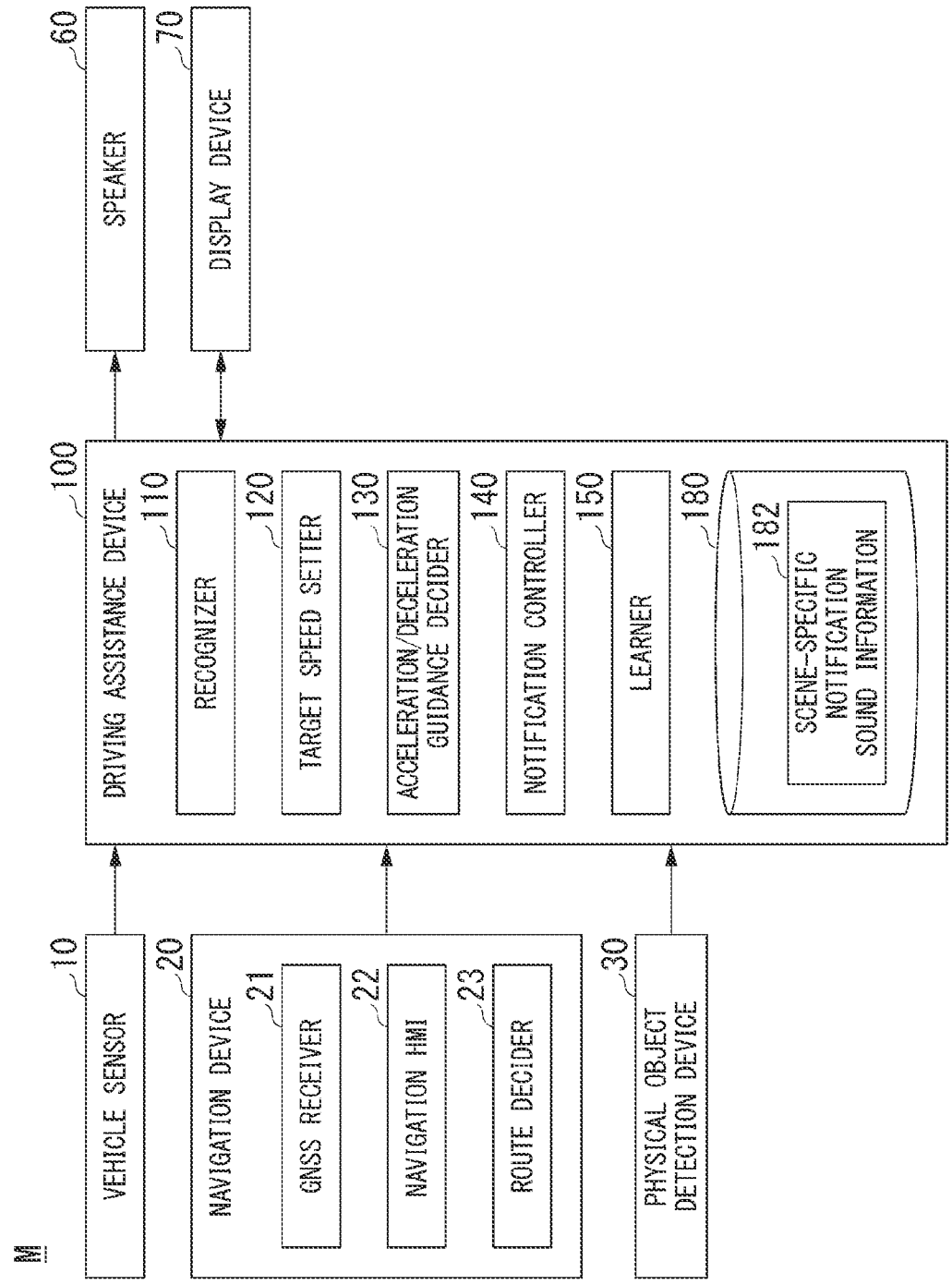
FIG. 1 is a diagram showing a device mounted in a vehicle M centered on a driving assistance device according to a first embodiment.

FIG. 1 is a diagram showing a device mounted in a vehicle M centered on a driving assistance device 100 according to the first embodiment. The vehicle M may be any of an automobile powered by an internal combustion engine such as a diesel engine or a gasoline engine, an electric vehicle powered by an electric motor, or a hybrid vehicle in which an internal combustion engine and an electric motor are combined. Although illustrations for components for causing the vehicle M to travel, for example, a driving operation element, a drive device such as an engine or a motor, a steering device, a brake device, and the like, and description thereof are omitted in the present embodiment, these components may be mounted in the vehicle M.

For example, a vehicle sensor 10, a navigation device 20, a physical object detection device 30, a speaker 60, a display device 70, the driving assistance device 100, and the like are mounted in the vehicle M.

The vehicle sensor 10 includes some or all of a vehicle speed sensor configured to detect the speed of the vehicle M, an acceleration sensor configured to detect acceleration, a yaw rate sensor configured to detect an angular speed around a vertical axis, a direction sensor configured to detect a direction of the vehicle M, a gradient sensor configured to detect a gradient of a point where the vehicle M is located, and the like. The vehicle sensor 10 may include a position sensor configured to acquire a position of the vehicle M. The position sensor is, for example, a sensor configured to acquire position information (longitude/latitude information) from a Global Positioning System (GPS) device. The position sensor may be a sensor configured to acquire position information using a global navigation satellite system (GNSS) receiver 21 of the navigation device 20.

For example, the navigation device 20 includes the GNSS receiver 21, a navigation human machine interface (HMI) 22, and a route decider 23. The navigation device 20 stores map information in a storage device such as a hard disk drive (HDD) or a flash memory. The GNSS receiver 21 identifies a position of the vehicle M on the basis of a signal received from a GNSS satellite. The position of the vehicle M may be identified or corrected by an inertial navigation system (INS) using an output of the vehicle sensor 10. The navigation HMI 22 includes a display device, a speaker, a touch panel, keys, and the like. For example, the route decider 23 decides on a route (hereinafter referred to as a route on a map) from the position of the vehicle M identified by the GNSS receiver 21 (or any input position) to a destination input by the occupant using the navigation HMI 22 with reference to the map information. The map information is, for example, information in which a road shape is expressed by a link indicating a road and nodes connected by the link. The map information may include the curvature and gradient of a road (an uphill or downhill road), the number of lanes, a legal speed, type information (for example, a merging segment, a branch segment, a toll booth, and information indicating whether or not a roadway and a sidewalk are clearly separated in an urban area, a highway, a general national road, and the like), point of interest (POI) information, and the like. The navigation device 20 may perform route guidance using the navigation HMI 22 on the basis of the route on the map. The navigation device 20 may be implemented, for example, by establishing a communication connection of a terminal device such as a smartphone or a tablet terminal possessed by the occupant with the driving assistance device 100. The navigation device 20 may transmit a current position and a destination to a navigation server via the communication device and acquire a route equivalent to the route on the map from the navigation server.

The physical object detection device 30 includes, for example, a camera, radar device, a light detection and ranging (LIDAR) sensor, a sensor fusion device, and the like. The physical object detection device 30 detects types and positions of physical objects (other vehicles, two-wheeled vehicles, bicycles, pedestrians, road markings, road signs, marks, and the like) located around the vehicle M using known functions. The physical object detection device 30 may be capable of detecting the speed of the physical object.

The speaker 60 outputs a sound to the cabin of the vehicle M. The speaker 60 may be a speaker unit including a plurality of sub-speakers. In this case, the position of the sound image may be arbitrarily set. For example, when the speaker 60 is a speaker unit, the sub-speaker is at least one or more of a space in front of the driver's seat where the driver sits (for example, an instrument panel in the cabin) and a space behind the driver's seat (for example, a headrest of the driver's seat, a rear seat, or a rear cabin space). A plurality of sub-speakers may be provided as surround speakers to surround the driver's seat so that a surround sound can be provided in the cabin.

The display device 70 is, for example, a touch panel, and is attached to any location inside of the cabin of the vehicle M. The display device 70 receives various types of operations for the driving assistance device 100 and displays an instruction image from the driving assistance device 100 or the like. The speaker 60 and the display device 70 may be provided integrally with the navigation HMI 22 or may be provided separately.

The driving assistance device 100 includes, for example, a recognizer 110, a target speed setter 120, an acceleration/deceleration guidance decider 130, a notification controller 140, a learner 150, and a storage 180. The components other than the storage 180 are implemented, for example, by a hardware processor such as a central processing unit (CPU) executing the program (software). Also, some or all of these components may be implemented by hardware (including a circuit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as a hard disk driver (HDD) or a flash memory or may be stored in a removable storage medium (a non-transitory storage medium) such as a digital video disc (DVD) or a compact disc (CD)-read-only memory (ROM) and installed when the storage medium is mounted in a drive device. The acceleration/deceleration guidance decider 130 is an example of a "decider."

The storage 180 may be implemented by the above-described various types of storage devices, a solid-state drive (SSD), an electrically erasable programmable read only memory (EEPROM), a ROM, a random-access memory (RAM), or the like. The storage 180 stores, for example, scene-specific notification sound information 182, programs, and other various types of information, and the like. The content of the scene-specific notification sound information 182 will be described below. The storage 180 may store the map information described above.

The recognizer 110 recognizes a surrounding situation (a travel scene) of the vehicle M on the basis of a detection result of the physical object detection device 30. For example, the recognizer 110 recognizes a position, a speed, an acceleration state, and the like of a physical object located near the vehicle M. The position of the physical object is recognized, for example, as a position on absolute coordinates with a representative point (the center of gravity, the center of the drive shaft, or the like) of the host vehicle M as the origin, and used for control. The position of the physical object may be represented by a representative point such as the center of gravity or a corner of the physical object or may be represented by a represented area. For example, when the physical object is a mobile object such as another vehicle, the "state" of the physical object may include the acceleration and jerk of the mobile object, or an "action state" (for example, whether or not a lane change is being made or intended).

For example, the recognizer 110 performs a known analysis process (for example, edge extraction, feature quantity extraction, a pattern matching process, a character recognition process, or the like) on an image captured by the camera of the physical object detection device 30 (hereinafter, a camera image) and recognizes a target for identifying a lane position including a road marking, a road shape, a road shoulder, a curb, a median strip, a guardrail, a fence, a wall, and the like (a roadway boundary or a road boundary) from an image analysis result. The recognizer 110 may recognize a gradient of a road from a road shape, a road sign, and the like obtained from results of analyzing the camera image. The recognizer 110 may recognize that the shape of the road on which the vehicle M is traveling (which may include the shape of the road that is expected to travel in the near future) is a specific road segment where the speed of the vehicle M is expected to change. The specific road segment is, for example, a merging segment, a branch segment, an uphill segment, a downhill segment, a toll gate segment, or the like. Hereinafter, as an example of the specific road segment, a merging segment will be used for description. For example, the recognizer 110 may recognize that the shape of the road on which the vehicle M is traveling is a merging segment or a non-merging segment. The recognizer 110 may recognize a temporary stop line, an obstacle, red light, and other road events.

The recognizer 110 may recognize lanes around the vehicle M including a travel lane in which the vehicle M travels with reference to the map information on the basis of the position of the vehicle M detected by the vehicle sensor 10 or the GNSS receiver 21. The recognizer 110 may recognize that the lane in which the vehicle M is traveling or the shape of the road on which the vehicle M is expected to travel in the future is a merging segment or a non-merging segment.

The target speed setter 120 sets a target speed V # at which the vehicle M should travel. The target speed setter 120, for example, acquires information about a legal speed of the lane in which the vehicle M travels from the navigation device 20 or the recognizer 110, and sets the legal speed of the acquired information as the target speed V #. The target speed setter 120 may set the target speed V # to a value less than the legal speed according to the curvature and gradient of the road. The target speed setter 120 may set the target speed V # to a value smaller than the legal speed in accordance with the degree of congestion of physical objects detected by the physical object detection device 30 (for example, a degree of congestion based on the number of forward vehicles). When the physical object detection device 30 detects a pedestrian of a threshold value or more on a road where the roadway and the sidewalk are not clearly separated, the target speed setter 120 may set the target speed V # to a value less than the legal speed so that it voluntarily decelerates. Information indicating that the vehicle M is traveling on a road where the roadway and the sidewalk are not clearly separated may be acquired from the navigation device 20 or may be acquired by analyzing the image captured by the camera of the physical object detection device 30 in the driving assistance device 100.

The acceleration/deceleration guidance decider 130 determines whether or not to prompt the driver of the vehicle M to perform acceleration or deceleration on the basis of the state of the vehicle M. The state here includes, for example, a speed V and target speed V #. For example, the acceleration/deceleration guidance decider 130 decides which of acceleration and deceleration the driver of the vehicle M is prompted to perform on the basis of a comparison between the speed V of the vehicle M and the target speed V #. For example, the acceleration/deceleration guidance decider 130 decides to prompt the driver of the vehicle M to perform deceleration when the speed V is greater than the target speed V # and a difference therebetween is greater than or equal to a threshold value. The acceleration/deceleration guidance decider 130 determines to prompt the driver of the vehicle M to perform acceleration when the speed V is lower than the target speed V # and the difference therebetween is greater than or equal to the threshold value. The acceleration/deceleration guidance decider 130 decides not to prompt the driver of the vehicle M to perform acceleration or deceleration when the difference between the speed V and the target speed V # is less than the threshold value. In addition, the acceleration/deceleration guidance decider 130 may decide whether or not to prompt acceleration or deceleration on the basis of the curvature or gradient of the road, the degree of congestion around the vehicle M, or the like.

Furthermore, the acceleration/deceleration guidance decider 130 may decide a degree of acceleration/deceleration the driver of the vehicle M is prompted to perform. For example, the acceleration/deceleration guidance decider 130 decides to increase the degree of acceleration/deceleration as a magnitude of a difference (a degree of deviation) between the speed V and the target speed V # increases. For example, the acceleration/deceleration guidance decider 130 designates a degree of acceleration or deceleration the driver of the vehicle M is prompted to perform as a high level when the degree of deviation is greater than or equal to a reference value (a value larger than the above-described threshold value), designates the degree of acceleration or deceleration the driver of the vehicle M is prompted to perform as a low level when the degree of deviation is less than the reference value, and decides on the degree of acceleration or deceleration the driver of the vehicle M is prompted to perform at two levels of the high level and the low level. By setting a plurality of reference values as described above, the degree of acceleration can be decided at multiple levels.

When the acceleration/deceleration guidance decider 130 decides to notify the driver of either acceleration or deceleration, the notification controller 140 causes the speaker 60 to output a corresponding notification sound (an acceleration guidance notification sound or a deceleration guidance notification sound). When the difference between the speed V and the target speed V # is less than the threshold value, the notification controller 140 may cause the speaker 60 to output a notification sound (an OK notification sound) for notifying that the current speed is desirable (neither of acceleration and deceleration is necessary) instead of providing a notification for prompting the driver of the vehicle M to perform either acceleration or deceleration. The OK notification sound is a notification sound different from the acceleration guidance notification sound and the deceleration guidance notification sound. The OK notification sound may be output, for example, when the difference between the speed V and the target speed V # is less than the threshold value after the acceleration guidance notification sound or the deceleration guidance notification sound is output. When these notification sounds are output, the notification controller 140 refers to the scene-specific notification sound information 182 on the basis of a surrounding situation of the vehicle recognized by the recognizer 110, decides which notification sound is to be used for which notification on the basis of a surrounding situation (a scene type) and notification content (a notification type), and causes the speaker 60 to output the decided notification sound.

Figures 2, 3:
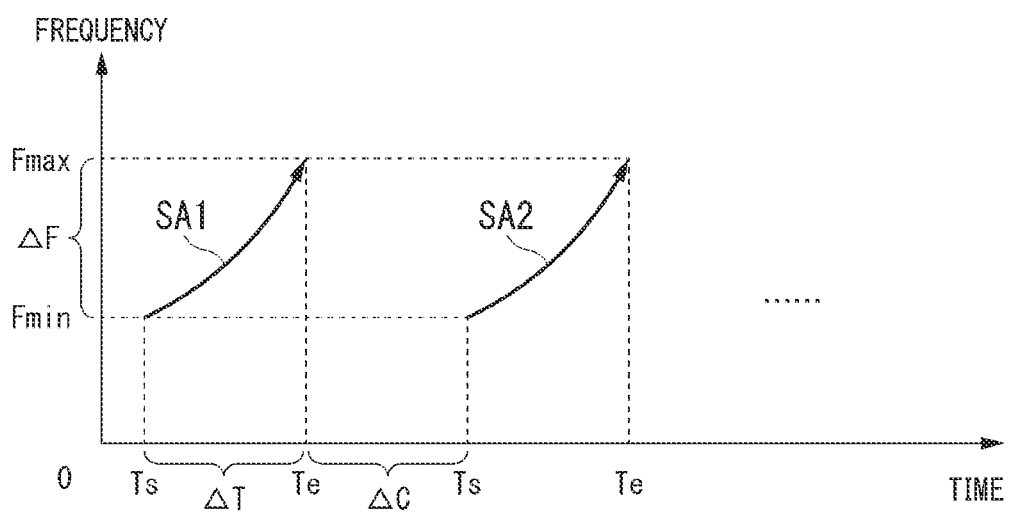
FIG. 2 is a diagram showing an example of content of scene-specific notification sound information.
FIG. 3 is a diagram for describing a structure of an acceleration guidance notification sound.

FIG. 2 is a diagram showing an example of content of the scene-specific notification sound information 182. The scene-specific notification sound information 182 is information in which notification sound information is associated with a scene type and a notification type. The scene type includes information about the surrounding situation (travel scene) of the vehicle M. Scene types include, for example, a scene during merging (a scene during traveling in a merging segment), a scene during traveling in a straight road segment (an example of a segment other than a specific road segment), and the like. The notification type includes information about notification content (for example, acceleration guidance, deceleration guidance, and maintenance of a current state due to a speed difference less than the threshold value (an OK notification)). The notification sound information includes information about a notification sound (for example, an acceleration guidance notification sound, a deceleration guidance notification sound, or an OK notification sound) corresponding to the scene type and the notification type. The notification sound in the embodiment is, for example, a notification sound obtained by continuously changing a structure of the sound. "Continuously changing the structure of the sound" is, for example, continuously changing a frequency or pitch of the sound greatly or slightly. The pitch is, more specifically, a pitch (melodic pitch) for sequentially output sounds. In the notification sound information, a notification sound whose frequency or pitch changes with the degree of acceleration/deceleration the driver of the vehicle M is prompted to perform or the degree of deviation between the speed V of the vehicle M and the target speed V # may be set. The change degree is, for example, a magnitude of a change in at least one of an iteration cycle, a magnitude of a frequency, an amount of change in the frequency, and a volume of the notification sound. The notification sound information may include information about a sound (a notification end sound) that conveys the output of the notification. The notification sound information may include sound information (a human voice or a mechanical voice) in addition to the notification sound.

The information included in the scene-specific notification sound information 182 may be fixed information set in advance or may be arbitrarily set by the driver. When the information is set by the driver, for example, information (such as notification sound information) received by the display device (touch panel) 70 is registered (or updated) in the scene-specific notification sound information 182.

The notification controller 140 may cause the speaker to output the notification sound set in the scene-specific notification sound information 182 when the difference between the speed V of the vehicle M and the target speed V # becomes greater than or equal to the threshold value and may determine whether or not to continuously output the notification sound in accordance with a surrounding situation (a notification type) of the vehicle M when the difference between the speed V of the vehicle M and the target speed V # is less than the threshold value. For example, the notification controller 140 causes a notification sound to be output even though the difference between the speed V of the vehicle M and the target speed V # is less than the threshold value when the vehicle M is traveling in a specific road segment and causes the output of the notification sound to end at a timing when the difference is less than the threshold value when the vehicle M is traveling in a segment other than the specific road segment. If the specific road segment includes a merging segment, the notification controller 140 may end the output of the notification sound when the vehicle M has completed merging from a merging lane in the merging segment into a main lane (for example, when the vehicle M has passed a merging completion point).

When the difference between the speed of the vehicle M and the target speed V # is less than the threshold value in a state in which the acceleration guidance notification sound or the deceleration guidance notification sound has been output, the notification controller 140 may determine whether or not to end the notification sound on the basis of content set by the driver. The notification controller 140 causes the output of the notification sound to end by receiving an end instruction from the driver when the difference between the speed of the vehicle M and the target speed V # is less than the threshold value in the state in which the acceleration guidance notification sound or the deceleration guidance notification sound has been output. Thereby, notification control indicated in an instruction from the driver can be executed.

The notification controller 140 may cause the speaker 60 to output a notification sound via a device capable of generating and synthesizing a desired sound such as a synthesizer instead of (or in addition to) a process of acquiring a notification sound corresponding to the state or the surrounding situation of the vehicle with reference to the scene-specific notification sound information 182. In addition to (or instead of) the notification sound, the notification controller 140 may generate an image for prompting the driver to perform acceleration or deceleration or an image for maintaining the current speed and cause the display device 70 to display the image.

The learner 150 learns a notification sound of a notification provided to the driver on the basis of the degree of change in the traveling of the vehicle M due to manual driving after the notification sound is output. For example, the learner 150 learns a notification sound preferred by the driver (in other words, a notification sound for easily guiding the driver to perform specific driving (acceleration, deceleration, or maintenance of a current state) on the basis of a previously output notification sound and a result of guiding the vehicle M after the notification and updates the scene-specific notification sound information 182 on the basis of a learning result. For example, the learner 150 causes the notification controller 140 to output a predetermined notification sound for prompting the driver to accelerate or decelerate the vehicle M and learns the notification sound preferred by the driver on the basis of the acceleration or deceleration of the vehicle M obtained from the vehicle sensor 10 after the notification sound is output, a period of time until the difference between the speed of the vehicle M and the target speed V # is less than the threshold value, and the like. For example, the learner 150 learns a notification sound having a shortest period of time until a difference between the speed V of the vehicle M and the target speed V # is less than the threshold value from the output of the notification sound as the notification sound preferred by the driver. After a predetermined notification sound (OK notification sound) is output when the difference between the speed V of the vehicle M and the target speed V # is less than the threshold value, the learner 150 may learn a notification sound having a longest period of time in which a state in which the difference is less than the threshold value continues as the notification sound preferred by the driver.

The learner 150 can cause the notification sound preferred by the driver to be provided in accordance with each scene and make it easier for the driver to drive comfortably by performing the above-described learning for each surrounding situation (for each scene) and registering (or updating) the learned notification sound in the scene-specific notification sound information 182.

The learner 150 may generate a trained model in which the surrounding situation of the vehicle M recognized by the recognizer 110 is designated as an input and a notification sound is designated as an output. This trained model, for example, is updated with an artificial intelligence (AI) function such as machine learning (a neural network), deep learning, or the like using training (correct answer) data. The trained model may be stored in the storage 180 or may be acquired from an external device via a network. The notification controller 140 causes a notification sound to be output using the learned model. If the notification sound is not updated in the learning as described above, the driving assistance device 100 may not have the function of the learner 150.

Although driving operation elements such as the accelerator pedal, the brake pedal, and the steering wheel, a motive power output device for performing acceleration/deceleration or steering in accordance with an operation amount of the driving operation element, a steering device, and the like are mounted in the vehicle M, illustrations and detailed description thereof will be omitted. In the following description, an accelerator opening degree, which is an operation amount of the accelerator pedal, may be denoted by Qap.

[Regarding Driving Assistance with Notification Sound]

Next, the driving assistance based on a notification sound according to the embodiment will be described. Hereinafter, as an example, a case where the driving assistance device 100 assists the driver in smoothly merging onto a main roadway will be described. For example, when the legal speeds of the merging lane and the main lane are different, or when there are other vehicles near the merging point, it is necessary to adjust the speed of the vehicle M in accordance with the legal speed of the driving lane and the speed of another vehicle. However, if the driver is inexperienced in driving or is not good at merging, there is a possibility that the driver will be unable to adjust the speed appropriately and the merging will not be smooth. Therefore, because the driving assistance device 100 of the embodiment can cause the driver to intuitively ascertain a speed of the vehicle M to be set by outputting an acceleration guidance notification sound, a deceleration guidance notification sound, an OK notification sound, or the like from the speaker 60 in accordance with the surrounding situation or the like at the time of merging, it is possible to prompt the driver to perform appropriate speed adjustment (acceleration, deceleration, or maintenance of the current state). In the present embodiment, similar notification control can be performed not only for merging segments, but also for other specific road segments such as branches and slopes and roads that are not specific road segments (for example, straight highways and the like).

[Regarding Notification Sound]

For example, the notification controller 140 causes an acceleration guidance notification sound for encouraging the driver to perform acceleration to be output when the driver is prompted to accelerate the vehicle M and causes a deceleration guidance notification sound for encouraging the driver to perform deceleration to be output when the driver is prompted to decelerate the vehicle M. When the current speed of the vehicle M is desired to be continued, the notification controller 140 causes a stable neutral notification sound (an OK notification sound) that does not make the driver aware of acceleration or deceleration to be output. An example of the notification sound corresponding to the speed adjustment the driver is prompted to perform will be described below. Notification sounds to be output in the embodiment are not limited to the following examples.

FIG. 3 is a diagram for describing a structure of the acceleration guidance notification sound. In FIG. 3, the horizontal axis represents time and the vertical axis represents a sound frequency. The same is also true for FIGS. 4 and 5, which will be described below. Each of SA1 and SA2 in FIG. 3 is one notification sound included in the acceleration guidance notification sound. The acceleration guidance notification sound may include three or more notification sounds. Unless a plurality of notification sounds SA1, SA2, and the like are particularly distinguished, they are collectively referred to as a "notification sound SA." The notification sound SA shown in FIG. 3 indicates a change in a frequency over time, and the arrow of the notification sound SA is shown to facilitate understanding of the frequency change tendency. The notification sound SA includes a plurality of sounds. For example, the notification sound SA is a notification sound obtained by continuously changing a structure of the sound and is, more specifically, a notification sound obtained by greatly changing the frequency of the sound continuously (or stepwise). The increasing tendency of the frequency of the notification sound SA may change nonlinearly (for example, a downwardly convex curve) as shown in FIG. 3 or may change linearly. A minimum frequency Fmin and a maximum frequency Fmax of the notification sound SA, a frequency change amount $\Delta F$, an output period of time $\Delta T$ of one notification sound SA (a period from a notification start time Ts to a notification end time Te), an iteration cycle $\Delta C$, the increasing tendency (linear or non-linear) of a frequency, and the like can be changed according to a surrounding situation (a scene type) and a degree of acceleration (or a degree of deviation) and information thereof is stored, for example, in the scene-specific notification sound information 182. Although the notification sound SA that is iteratively output as the acceleration guidance notification sound is the same in the example of FIG. 3, the minimum frequency Fmin, the maximum frequency Fmax, or the frequency change amount $\Delta F$ may be increased, the output period of time $\Delta T$ or the iteration cycle $\Delta C$ may be shortened, or the volume may be increased to an upper limit as the number of iterations increases in place thereof.

Because the continuous sound whose volume is gradually increased makes it easier to remind the driver of acceleration by iteratively outputting a notification sound with a continuously increased frequency during acceleration guidance as shown in FIG. 3, it is possible to output an acceleration guidance notification sound for encouraging the driver to perform acceleration.

Figure 4:
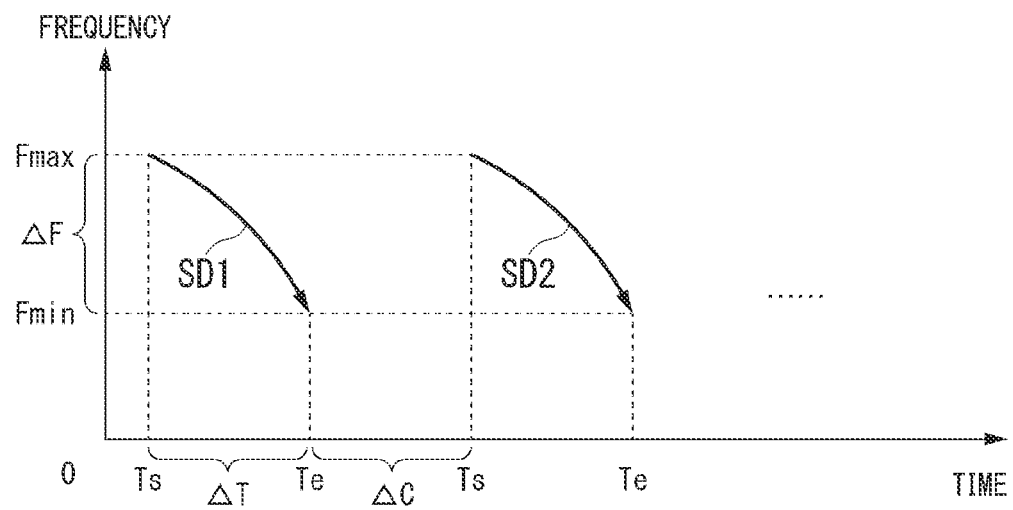
FIG. 4 is a diagram for describing a structure of a deceleration guidance notification sound.

FIG. 4 is a diagram for describing a structure of the deceleration guidance notification sound. Each of SD1 and SD2 in FIG. 4 is one notification sound included in the deceleration guidance notification sound. The deceleration guidance notification sound may include three or more notification sounds. Unless a plurality of notification sounds SD1, SD2, and the like are particularly distinguished, they are collectively referred to as a "notification sound SD." Like the notification sound SA, the notifications sound SD includes a plurality of sounds. For example, the notification sound SD is a notification sound obtained by continuously changing a structure of the sound and is, more specifically, a notification sound obtained by slightly changing the frequency of the sound continuously (or stepwise). The decreasing tendency of the frequency of the notification sound SD may change nonlinearly (for example, an upwardly convex curve) as shown in FIG. 4 or may change linearly. A minimum frequency Fmin and a maximum frequency Fmax of the notification sound SD, a frequency change amount $\Delta F$, an output period of time $\Delta T$ of one notification sound SD, an iteration cycle $\Delta C$, the decreasing tendency (linear or non-linear) of a frequency, and the like can be changed according to a surrounding situation (a scene type) and a degree of deceleration (or a degree of deviation) and information thereof is stored, for example, in the scene-specific notification sound information 182. Although the notification sound SD that is iteratively output as the deceleration guidance notification sound is the same in the example of FIG. 4, the frequency change amount $\Delta F$ may be increased, the output period of time $\Delta T$ or the iteration cycle $\Delta C$ may be shortened, or the volume may be increased to an upper limit as the number of iterations increases in place thereof.

As shown in FIG. 4, during deceleration guidance, the speaker 60 is allowed to output a notification sound having a continuously changing sound structure different from that during acceleration guidance. Because the continuous sound whose volume is gradually decreased makes it easier to remind the driver of deceleration by iteratively outputting a notification sound with a continuously decreased frequency during deceleration guidance, it is possible to output a deceleration guidance notification sound for encouraging the driver to perform deceleration.

Figure 5:
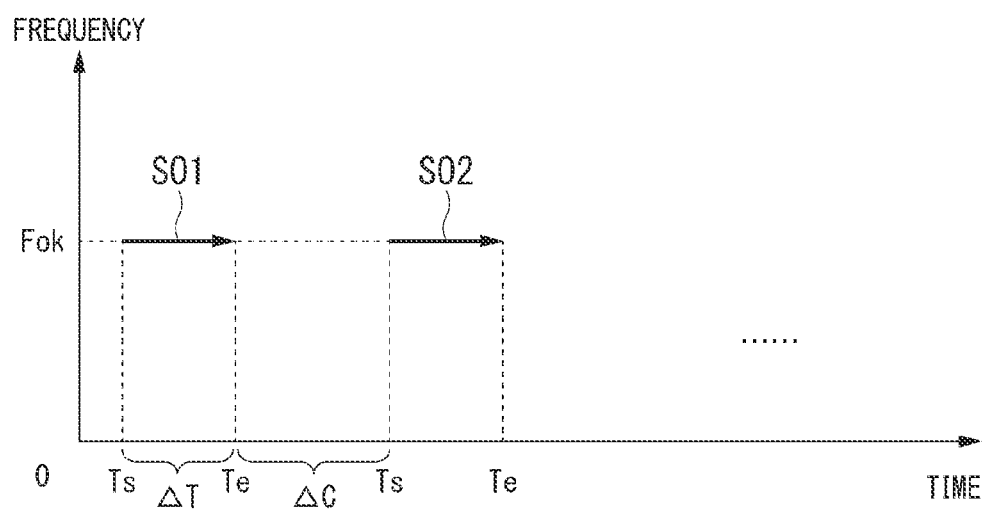
FIG. 5 is a diagram for describing a structure of an OK notification sound (a neutral notification sound).

FIG. 5 is a diagram for describing a structure of the OK notification sound (neutral notification sound). Each of SO1 and SO2 in FIG. 5 is one notification sound included in the OK notification sound. The OK notification sound may include three or more notification sounds. Unless a plurality of notification sounds SO1, SO2, and the like are particularly distinguished, they are collectively referred to as a "notification sound SO." The notification sound SO shown in FIG. 5 is different from the above-described notification sounds SA and SD in that the structure of a continuous sound is fixed (within a prescribed range). A frequency Fok in the notification sound SO is linear as shown in FIG. 5. The value of the frequency Fok, the output period of time ΔT, the iteration cycle ΔC, and the like of the notification sound SO can be changed according to a surrounding situation (scene type) and the like and information thereof is stored in, for example, the scene-specific notification sound information 182. Although the notification sound SO iteratively output as the OK notification sound is the same in the example of FIG. 5, the frequency Fok, the output period of time ΔT, the iteration cycle ΔC, the volume, and the like may be changed within a prescribed range.

When neither of acceleration guidance and deceleration guidance is performed as shown in FIG. 5, the speaker 60 is allowed to output a notification sound different from those during acceleration guidance and deceleration guidance. For example, by outputting a stable sound with a small change in the frequency during the OK notification, it becomes easier to remind the driver that acceleration or deceleration is unnecessary (or to remind the driver of maintaining the current speed). In this way, by differently using notification sounds according to the state of the vehicle M, it is possible to perform more appropriate driving assistance regarding the speed adjustment of the vehicle M.

In FIGS. 3 to 5 described above, a "frequency" of the vertical axis may be read as a "sound pitch." In this case, for example, an increasing tendency or decreasing tendency of the frequency can be read as a pitch change tendency and a frequency change amount can be read as a pitch difference. In other words, the notification controller 140 causes the speaker 60 to output a notification sound in which a frequency or pitch of a sound is continuously changed greatly or slightly during acceleration guidance or deceleration guidance. In this way, it is possible to perform more appropriate driving assistance regarding the speed adjustment of the vehicle M by selectively using the notification sound in accordance with the state of the vehicle M and the driving situation.

If the speaker 60 includes a plurality of sub-speakers provided in the cabin, the notification controller 140 may control the output of sounds from the plurality of sub-speakers so that the sound image of the notification sound flows (moves) from the rear to the front of the driver (the driver's seat) or from the front to the rear of the driver when the vehicle M is decelerated and when the vehicle M is accelerated. The movement of the sound image can be implemented, for example, by adjusting the volume according to the installation positions of the plurality of sub-speakers. For example, the notification controller 140 causes an output process to be performed so that a sound image flows from the rear to the front of the driver when an acceleration guidance notification sound is output and causes an output process to be performed so that a sound image flows from the front to the rear of the driver when a deceleration guidance notification sound is output. The flow direction (movement direction) may be opposite to that described above. When the OK notification sound is allowed to be output, the notification controller 140 causes the sound image to be output from one or both of the front and the rear without allowing the sound image to flow (without moving the sound image). In this way, by varying the output mode of the sound image according to the content of the speed adjustment, it is possible to prompt the driver to adjust the speed more reliably.

Next, a specific output mode of the notification sound output by the speaker 60 under the notification controller 140 will be described in detail. Hereinafter, two travel scenes will be separately described.

<First Scene: During Merging>

Figure 6:
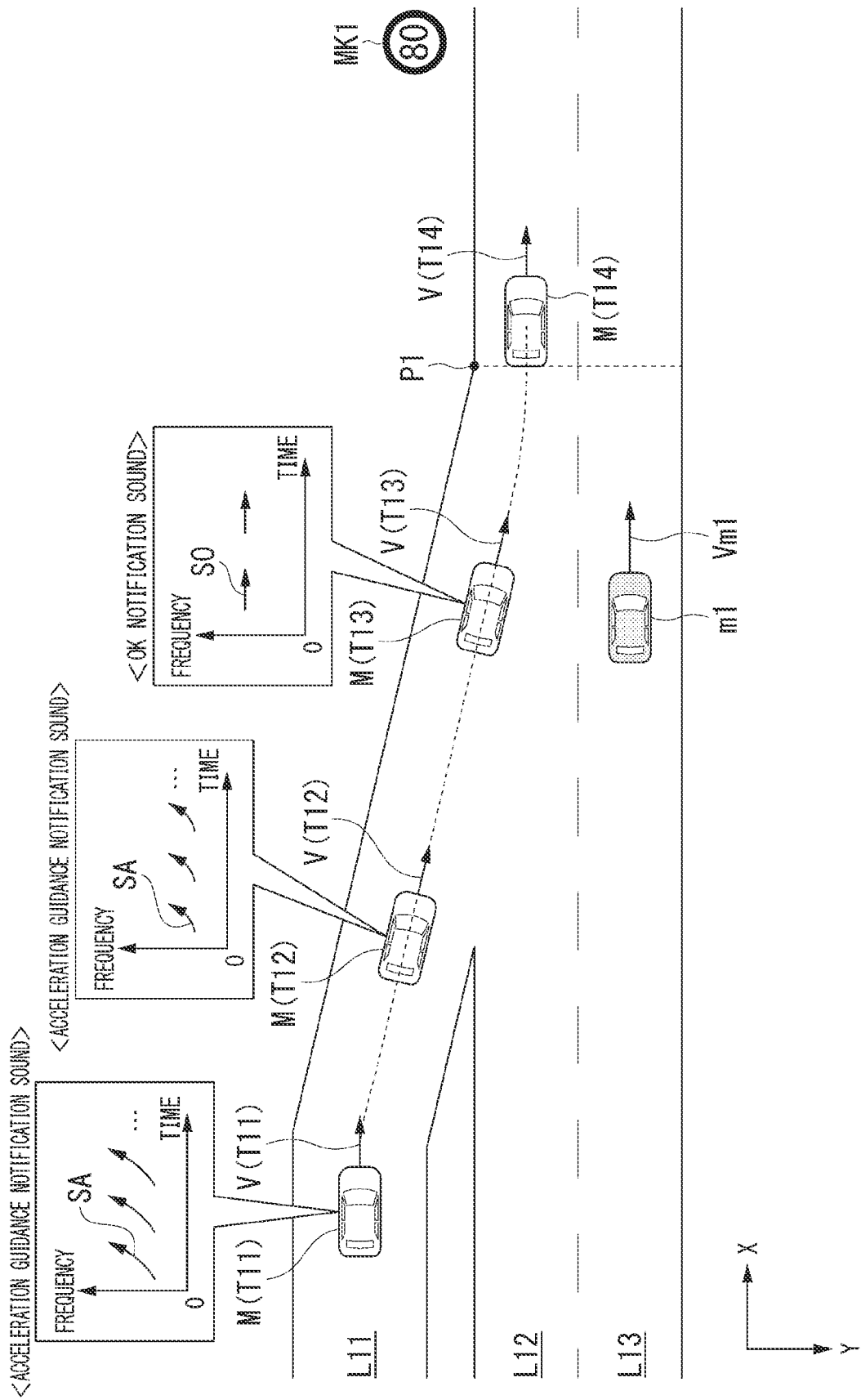
FIG. 6 is a diagram for describing notification content in a first scene.

FIG. 6 is a diagram for describing content of notification in the first scene. The first scene is a scene in which the vehicle M merges from the merging lane into the main lane in the merging segment. The example of FIG. 6 shows a road in a merging segment having a merging lane L11 and main lanes L12 and L13. In the example of FIG. 6, it is assumed that time T11 is earliest and times T12, T13, and T14 are later in order. In the example of FIG. 6, the position and speed of the host vehicle M at time T* are denoted by M(T*) and V(T*). The same is also true for FIG. 7, which will be described below. At time T11, it is assumed that the vehicle M (T11) is traveling in the merging lane L11 toward the main lane L2 at a speed V (T11).

The recognizer 110 recognizes the surrounding situation of the vehicle and recognizes that the vehicle M is traveling in the merging segment. The recognizer 110 acquires a legal speed on the main lane side with reference to the map information on the basis of the position information of the vehicle M and recognizes the acquired legal speed as the target speed V # of the vehicle M. The recognizer 110 may recognize a numerical value of a road sign MK1 indicating a speed limit of the main lanes L12 and L13 detected by the physical object detection device 30 as the target speed of the vehicle M. The target speed V # may be set, for example, so that a difference from the legal speed or speed limit is less than a prescribed speed. The recognizer 110 may recognize the target speed V # on the basis of a speed Vm1 of another vehicle traveling in the main lane (another vehicle m1 traveling in the lane L13 in the drawing). Furthermore, the recognizer 110 may recognize a speed suitable for merging (a speed that allows merging into the main lane without contacting other vehicles) as the target speed V # on the basis of a situation of nearby vehicles (for example, a traffic congestion situation) and the like.

When the difference between the speed V of the vehicle M obtained from the vehicle sensor 10 and the target speed V # is greater than or equal to the threshold value, the notification controller 140 causes the speaker 60 to output a notification sound for prompting the driver to accelerate or decelerate the vehicle M. At time T11, it is assumed that the speed V of the vehicle M is lower than the target speed V # by the threshold value or more. In this case, the notification controller 140 acquires notification sound information (an acceleration guidance notification sound) for prompting the driver to perform acceleration in the scene type "during merging" with reference to the scene-specific notification sound information 182 and causes the speaker 60 to output the acquired notification sound.

In the example of FIG. 6, at time T11, it is shown that one or more notification sounds SA whose frequencies are continuously increased with the elapse of time are iteratively output from the speaker 60 as the acceleration guidance notification sound. The minimum frequency Fmin and the maximum frequency Fmax of the notification sound SA, the frequency change amount ΔF, the output period of time ΔT of the notification sound SA, the iteration cycle ΔC, the increasing tendency of the frequency (linear or nonlinear), and the like may change with various types of conditions such as a difference (a degree of deviation) between the speed V of the vehicle M and the target speed V #, a degree of acceleration, a degree of congestion, the remaining distance to the point (hereinafter referred to as "merging completion point") P1 where the merging should be completed, and the speed V of the vehicle M.

By outputting this notification sound SA, the driver can be prompted to perform acceleration according to the sound. For example, because the notification is not a direct voice request such as "Please accelerate," it is possible to perform more appropriate driving assistance without making the driver excessively aware of acceleration driving in a state in which the driver is still at a distance (a prescribed distance or more) from the merging completion point P1 at time T11.

When the speed change amount of the vehicle M is less than a prescribed amount even though a prescribed period of time elapses after the acceleration guidance notification sound is output or when a distance to the merging completion point P1 is less than a prescribed distance, the notification controller 140 may cause a notification of the notification sound SA configured with a higher sound to be provided by increasing the increase rate of the frequency, shortening the iteration cycle, or increasing the frequency to be used. The notification controller 140 may increase the volume of the notification sound. Furthermore, the notification controller 140 may cause the speaker 60 to output a voice saying "Please accelerate" or may cause the display device 70 to output an image for prompting the driver to perform acceleration. Thereby, it is possible to more clearly notify the driver that the vehicle is in a state in which acceleration is necessary.

At time T12, the speed V of the vehicle M is lower than the target speed V # by a threshold value or more, but the speed difference (the degree of deviation) is smaller than at time T11. In this case, the notification controller 140 causes the acceleration guidance notification sound to be changed as compared with the acceleration guidance notification sound at time T11. For example, as shown in FIG. 6, the speaker 60 is allowed to output a notification sound having a smaller amount of change in the frequency and having a smaller maximum frequency Fmax than the notification sound SA of time T11. The notification controller 140 may cause one notification sound with a longer iteration cycle (interval) than at time T11 to be output. Thereby, the driver can ascertain that the speed V of the vehicle M is approaching the target speed V # only from the notification sound SA. For example, because the driver does not become excessively aware of the speed of the vehicle M as compared with a case where a sound such as "the speed of the vehicle is approaching the target speed" is output, more appropriate driving assistance can be provided.

At time T13, it is assumed that the difference between the speed V of the vehicle M and the target speed V # is less than the threshold value. In this case, the notification controller 140 causes the speaker 60 to output a notification sound SO (an OK notification sound) indicating that the speed is less than the threshold value with reference to the scene-specific notification sound information 182. Thereby, the driver can be notified that the current speed is suitable for merging.

During merging, the notification controller 140 causes the OK notification sound to be continuously output until merging is completed (for example, until the vehicle M passes the merging completion point P1 as at time T14). Thereby, it is possible to allow the driver to ascertain that the current speed V is suitable for merging. Even if the target speed V # suddenly changes due to a change in the behavior of another vehicle at the time of merging, the driver can easily ascertain the situation according to the change in the continuously output notification sound and can be allowed to perform more appropriate driving.

<Second Scene: During Traveling on Road that is not Merging Segment>

Figure 7:
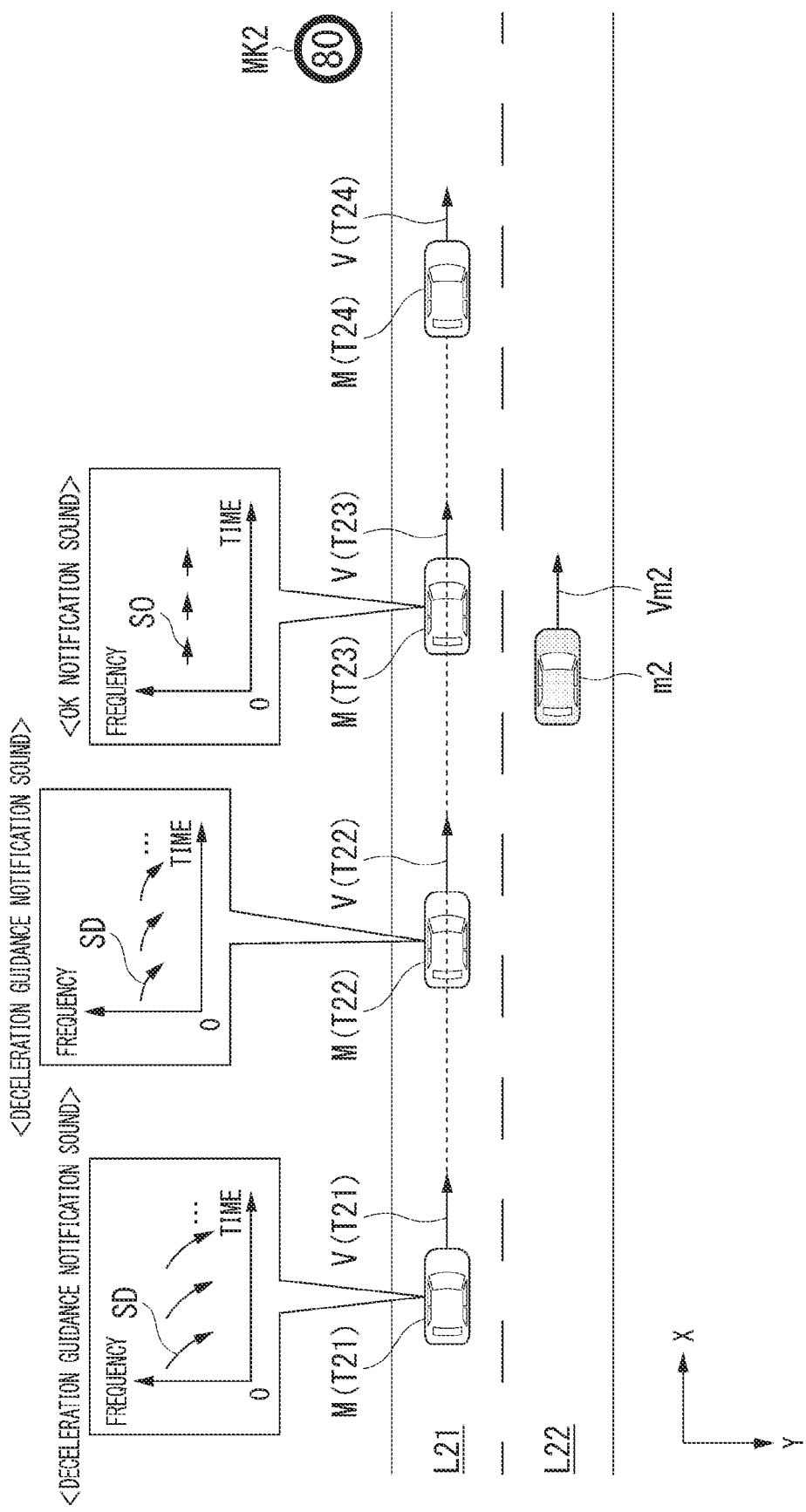
FIG. 7 is a diagram for describing notification content in a second scene.

FIG. 7 is a diagram for describing notification content in the second scene. The second scene is a scene in which a notification sound for prompting the vehicle M to accelerate or decelerate is output when the vehicle M is in a road segment that is not a merging segment. The "road segment that is not a merging segment" here is a road segment other than a specific road segment (for example, a straight road segment). In the example of FIG. 7, lanes L21 and L22 where the vehicle M can travel in the same direction (the X-axis direction in the drawing) are shown and it is assumed that the vehicle M is traveling in a lane L21 at a speed V. In the example of FIG. 7, a position and speed of the host vehicle M at time T* are denoted by M(T*) and V(T*). In the example of FIG. 7, it is assumed that time T21 is earliest and times T22, T23, and T24 are later in order.

At time T21, it is assumed that the vehicle M (T21) is traveling in the lane L21 at a speed V (T21). The recognizer 110 recognizes a surrounding situation of the vehicle and recognizes that the vehicle M is not traveling in a merging segment (or is traveling in a straight road segment). The recognizer 110 acquires the legal speed on the main lane side with reference to the map information on the basis of the position information of the vehicle M and recognizes the acquired legal speed as the target speed V # of the vehicle M. The recognizer 110 may recognize a numerical value of a road sign MK2 indicating a speed limit of the main lanes L21 and L22 detected by the physical object detection device 30 as the target speed of the vehicle M. The target speed V # is set, for example, so that the difference from the legal speed or the speed limit is less than a prescribed speed. The recognizer 110 may recognize the target speed V # on the basis of a speed Vm2 of another vehicle traveling in the lane L21 or L22 (another vehicle m2 traveling in the lane L22 in the drawing).

When the difference between the speed V of the vehicle M obtained from the vehicle sensor 10 and the target speed V # is greater than or equal to the threshold value, the notification controller 140 causes the speaker 60 to output a notification sound for prompting the driver to accelerate or decelerate the vehicle M. At time T21, it is assumed that the speed V of the vehicle M is greater than the target speed V # by the threshold value or more. In this case, the notification controller 140 acquires a deceleration guidance notification sound for prompting the driver to perform deceleration during traveling in a straight road segment with reference to the scene-specific notification sound information 182 and causes the acquired deceleration guidance notification sound to be output.

In the example of FIG. 7, at time T21, it is shown that one or more notification sounds SD whose frequency is continuously decreased with the lapse of time are iteratively output from the speaker 60 as the deceleration guidance notification sound. A minimum frequency Fmin and a maximum frequency Fmax of the notification sound SD, a frequency change amount ΔF, an output period of time ΔT of the notification sound SD, an iteration cycle ΔC, a decreasing tendency (linear or non-linear) of a frequency, and the like can change with various types of conditions such as a difference (a degree of deviation) between the speed V of the vehicle M and the target speed V #, a degree of acceleration, a degree of congestion, and a speed V of the vehicle M.

By outputting the notification sound SD, the driver can be prompted to perform deceleration based on the sound. For example, because the notification is not a direct voice request such as "Please decelerate," it is possible to provide more appropriate driving assistance without making the driver excessively aware of deceleration driving.

When the speed change amount of the vehicle M is less than a prescribed amount even though a prescribed period of time elapses after the deceleration guidance notification sound is output or a travel distance is a prescribed distance, the notification controller 140 may cause a notification of the notification sound configured with a higher sound to be provided by increasing the decrease rate of the frequency, shortening the iteration cycle of the notification sound, or increasing the frequency to be used. The notification controller 140 may increase the volume of the notification sound SD. Furthermore, the notification controller 140 may cause the speaker 60 to output a voice saying "Please decelerate" or may cause the display device 70 to output an image for prompting the driver to perform deceleration. Thereby, it is possible to more clearly notify the driver that the vehicle is in a state in which deceleration is necessary.

At time T22, the speed V of the vehicle M is higher than the target speed V # by a threshold value or more, but the speed difference (the degree of deviation) is smaller than at time T21. In this case, the notification controller 140 causes the deceleration guidance notification sound to be changed as compared with the deceleration guidance notification sound at time T21. For example, as shown in FIG. 7, the speaker 60 is allowed to output a notification sound having a smaller amount of change in the frequency and having a smaller maximum frequency than the notification sound of time T21. The notification controller 140 may cause one notification sound with a longer iteration cycle (interval) than at time T21 to be output. Thereby, the driver can be allowed to ascertain that the speed V of the vehicle M is approaching the target speed V # only from the notification sound SD. For example, because the driver does not become excessively aware of the speed of the vehicle M as compared with a case where a sound such as "the speed of the vehicle is approaching the target speed" is output, more appropriate driving assistance can be provided.

At time T23, it is assumed that the difference between the speed V of the vehicle M and the target speed V # is less than the threshold value. In this case, the notification controller 140 causes the speaker 60 to output the acquired OK notification sound with reference to the scene-specific notification sound information 182. An OK notification sound SO may be the same as or different from the OK notification sound during merging. In the case of a straight road segment (a non-merging segment), the notification controller 140 outputs the OK notification sound for a prescribed period of time and then ends the output. That is, even if the vehicle M does not pass through the straight road segment as at time T24, the output of the OK notification sound ends. This is because the vehicle can travel at a legal speed and a speed adapted to the traffic flow and the possibility of a large speed change occurring on a straight road or the like is low. Thereby, an excessive notification for the driver can be suppressed.

Although one or more notification sounds whose frequencies are continuously increased constitute the acceleration guidance notification sound, and one or more notification sounds whose frequencies are continuously decreased constitute the deceleration guidance notification sound in the above example, the present invention is not limited thereto. The notification sound may be a single sound or a combination of sounds. The notification controller 140 may switch a sound between a single sound or a combination of sounds according to the degree of deviation of the speed difference and the number of iterations of the notification sound.

When the output of the notification sound ends, the notification controller 140 may cause a sound indicating an end of the output of the notification (a notification end sound) to be output. Thereby, it is possible to allow the driver to easily ascertain that the notification relating to the speed adjustment will end. The notification end sound may be the same sound after the acceleration guidance notification, after the deceleration guidance notification, and after the OK notification. Thereby, the driver can be allowed to easily recognize that it is the notification end sound.

[Processing Flow]

Figure 8:
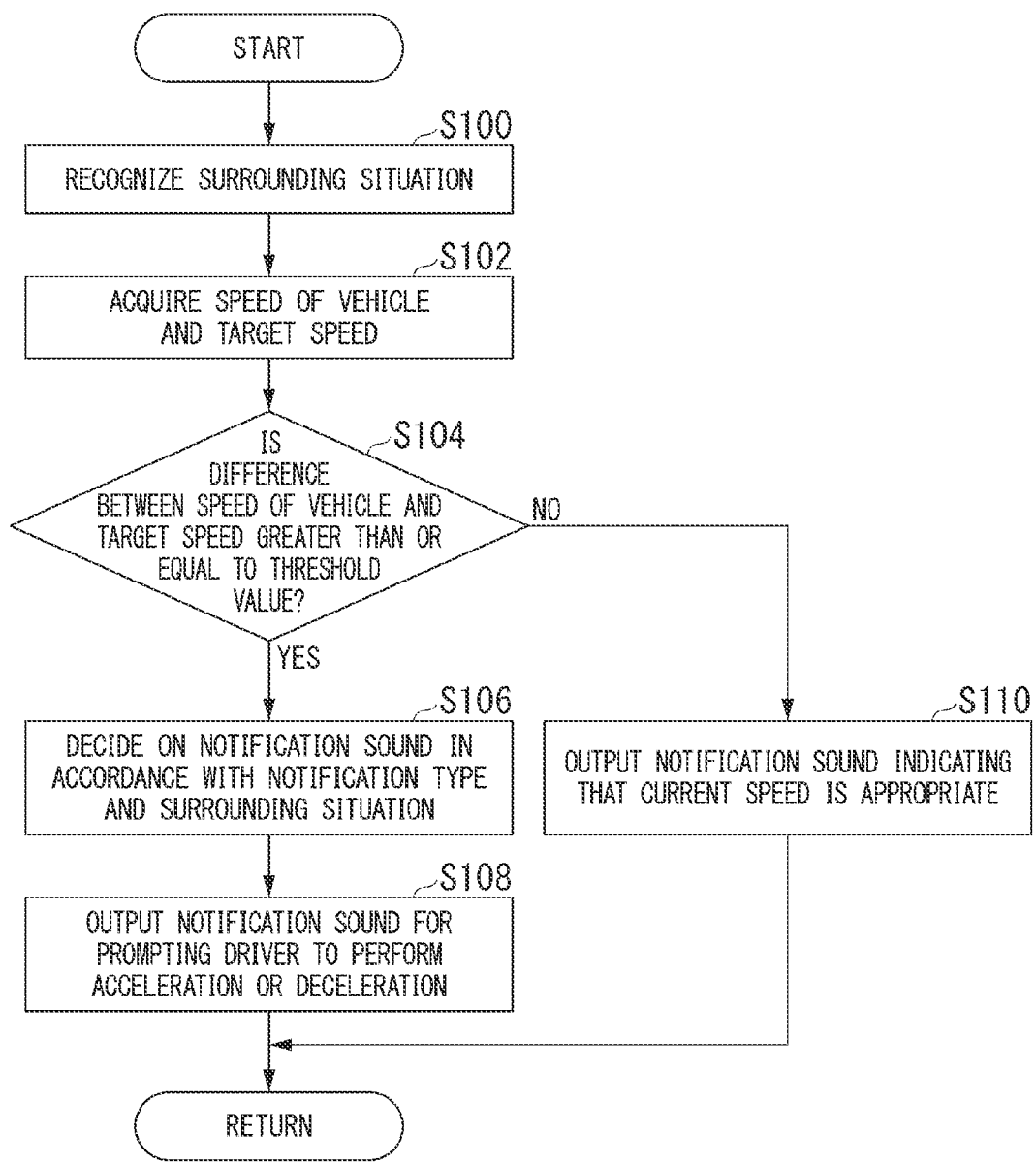
FIG. 8 is a flowchart showing an example of a flow of a process executed by the driving assistance device of the embodiment.

FIG. 8 is a flowchart showing an example of a flow of a process executed by the driving assistance device 100 of the embodiment. In the example of FIG. 8, a process relating to a notification of a notification sound according to a state of the vehicle M and a surrounding situation within the process executed by the driving assistance device 100 will be mainly described. The process to be described below may be iteratively executed at a predetermined timing or a predetermined cycle, for example, while the vehicle M is being driven by the driver.

In the example of FIG. 8, the recognizer 110 recognizes a surrounding situation of the vehicle M (step S100). Subsequently, the acceleration/deceleration guidance decider 130 acquires a speed V of the vehicle M and a target speed V #(step S102) and determines whether or not a difference between the speed V of the vehicle M and the target speed V # is greater than or equal to a threshold value (step S104). When it is determined that the difference is greater than or equal to the threshold value, the notification controller 140 decides on a notification sound in accordance with the notification content (a notification type) and the surrounding situation of the vehicle M recognized by the recognizer 110 so that the driver is prompted to perform acceleration or deceleration (step S106). Subsequently, the notification controller 140 causes the speaker 60 to output the notification sound (an acceleration guidance notification sound or a deceleration guidance notification sound) for prompting the driver to perform acceleration or deceleration so that speed control for making the speed V of the vehicle M close to the target speed V # is executed (step S108).

When it is determined that the difference between the vehicle speed V and the target speed V # is not greater than or equal to the threshold value (or is less than the threshold value) in the processing of step S104, the notification controller 140 causes the speaker 60 to output a notification sound (an OK notification sound) indicating that the current speed V is appropriate (step S110). In the processing of step S110, the notification controller 140 may control whether or not to continuously output the OK notification sound on the basis of the surrounding situation recognized by the recognizer 110. Thereby, the process of the present flowchart ends.

MODIFIED EXAMPLES

The notification controller 140 may switch whether or not to perform a notification process using the notification sound described above according to an instruction from the driver. The acceleration/deceleration guidance decider 130 may cause the storage 180 to store a past travel history and decide not to provide acceleration/deceleration guidance even if the difference between the speed V of the vehicle M and the target speed V # is greater than or equal to the threshold value when it is determined that the output of the notification sound is unnecessary from a traveling count included in the travel history and the like. Thereby, it is possible to suppress the notification of the notification sound during traveling in a merging segment where the driver is accustomed to traveling.

The notification sound in the embodiment may be changed in melody or musical instrument in accordance with the state of the vehicle M or the surrounding situation and may use a brake sound as the deceleration guidance notification sound or use an engine sound as the acceleration guidance notification sound. The notification controller 140 may adjust a frequency, volume, rhythm, intonation, or the like so that the notification sound becomes more audible in accordance with the age of the driver.

According to the first embodiment described above, the driving assistance device 100 includes the recognizer 110 configured to recognize a surrounding situation of a vehicle (an example of a mobile object) M; the acceleration/deceleration guidance decider (an example of a decider) 130 configured to decide whether or not to prompt a driver of the vehicle M to perform acceleration or deceleration on the basis of the surrounding situation; and the notification controller 140 configured to cause a speaker to output a notification sound for prompting the driver of the mobile object to perform the acceleration or deceleration on the basis of a decision result, wherein the notification sound is a notification sound obtained by continuously changing a structure of a sound, whereby it is possible to provide more appropriate driving assistance through a notification of a sound corresponding to a surrounding situation. Therefore, it is possible to contribute to the development of a sustainable transportation system.

For example, according to the first embodiment, when the vehicle M needs to be accelerated or decelerated in accordance with the surrounding situation and the like, it is possible to more appropriately output an acceleration or deceleration instruction to the driver by outputting a sound for encouraging the driver to perform acceleration or deceleration. Therefore, according to the first embodiment, sound-based acceleration/deceleration guidance can implement more appropriate driving assistance.

Second Embodiment

Figure 9:
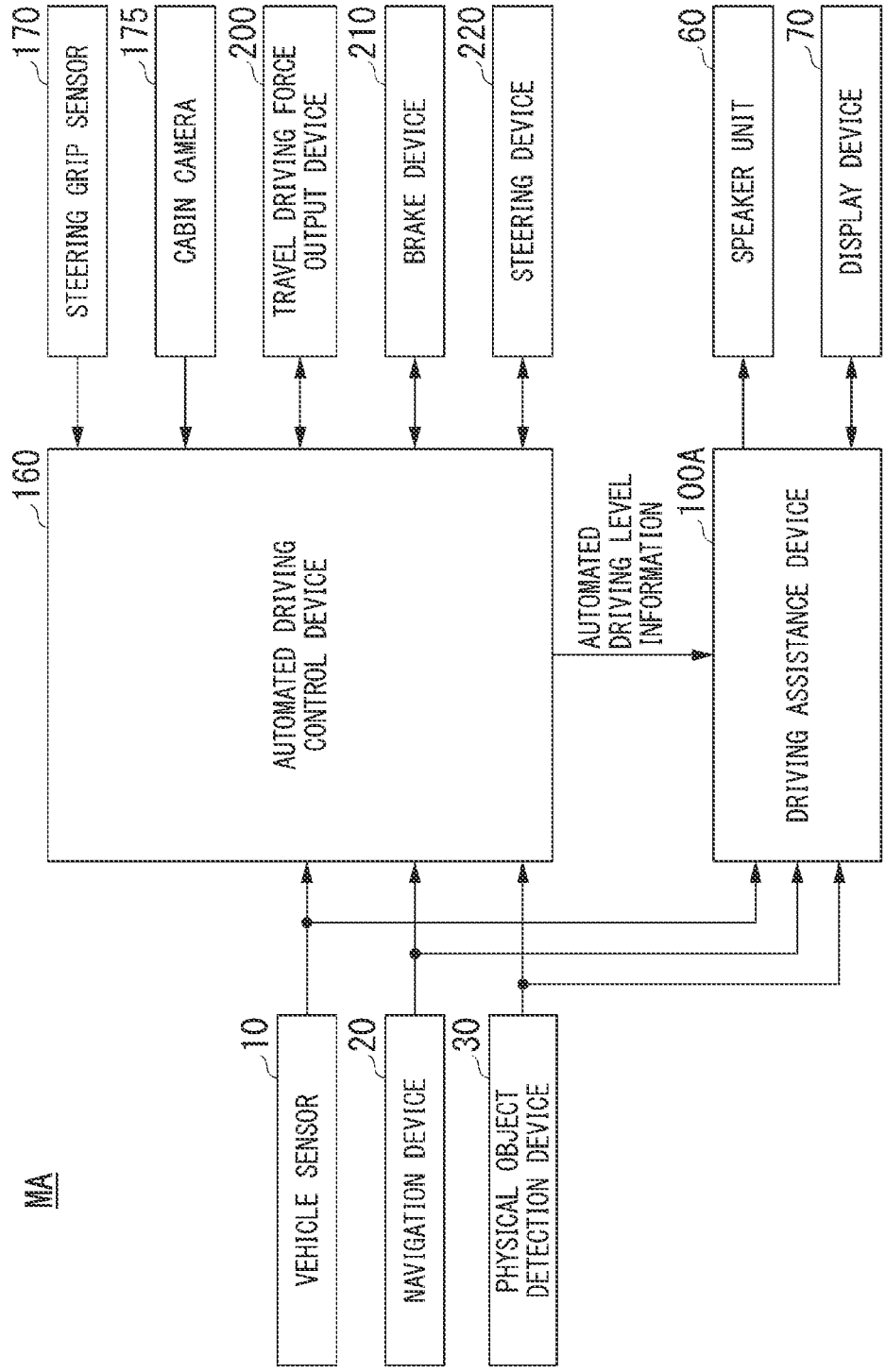
FIG. 9 is a diagram showing a device mounted in a vehicle M centered on a driving assistance device according to a second embodiment.

A second embodiment will be described below. A driving assistance device of the second embodiment is mounted in an automated driving vehicle. Automated driving is, for example, automatically controlling one or both of steering and a speed of a vehicle to execute driving control. An automated driving vehicle may be controlled by a manual operation of a user (for example, a driver) of the vehicle (so-called manual driving). FIG. 9 is a diagram showing a device mounted in a vehicle MA centered on a driving assistance device 100A according to the second embodiment. The driving assistance device 100A is mounted in the vehicle MA together with an automated driving control device 160. Output data from a vehicle sensor 10, a navigation device 20, and a physical object detection device 30 is also input to the automated driving control device 160. In addition to these, the output data of the navigation device and a micro processing unit (MPU) may also be input to the automated driving control device 160. The automated driving control device 160 recognizes the surrounding situation of the vehicle MA, recognizes an area where the vehicle MA can travel while avoiding contact with obstacles, generates a target trajectory (accompanied by a speed element) for the vehicle MA, and controls a travel driving force output device 200, a brake device 210, a steering device 220, and the like so that the vehicle MA can travel along a target trajectory. The travel driving force output device 200 includes an engine, a travel motor, and the like. Because details of the automated driving technology are known in various documents, more detailed description will be omitted.

The automated driving control device 160 is further connected to a steering grip sensor 170 and a cabin camera 175. The steering grip sensor 170 is used for detecting whether or not the driver is gripping a steering wheel, which is a steering operation element, and the cabin camera 175 is used for imaging a head of the driver from the front. The automated driving control device 160 determines whether or not the driver is gripping the steering wheel (hands-on) with reference to the output of the steering grip sensor 170 and determines whether or not the driver is visually recognizing a travel direction of the vehicle MA (eyes-on) by analyzing a captured image of the cabin camera 175. The automated driving control device 160 allows one or both of a process of releasing the steering wheel (hands-off) and a process of directing a visual line to a direction other than the traveling direction of the vehicle MA (eyes-on on the basis of a surrounding environment of the vehicle MA (a type of a road on which it is traveling), the speed of the vehicle MA, and the like. This allowed state may be referred to as an automated driving level. When an unallowed state has occurred (for example, when the driver has separated his or her hands from the steering wheel in the hands-on state), the automated driving control device 160 performs a process of switching driving to manual driving or the like if the unallowed state is not eliminated after notifying the driver to eliminate the unallowed state so that the unallowed state is eliminated. The automated driving control device 160 outputs information about the automated driving level (automated driving level information) to the driving assistance device 100A.

The driving assistance device 100A automatically stops the operation when both hands-off and eyes-off are allowed with reference to the automated driving level information. This is because, in this state, the driver's obligation to monitor the surroundings of the vehicle MA is temporarily eliminated and control for avoiding contact with risky physical objects is performed by the automated driving control device 160. Other functions are similar to those of the first embodiment. That is, when it is determined that the manual driving is executed in the automated driving vehicle (the vehicle MA) according to the automated driving level information, the driving assistance device 100A executes notification control of the notification sound on the basis of the state or the surrounding situation of the vehicle MA like the driving assistance device 100 of the first embodiment.

According to the above-described second embodiment, the driving assistance device 100A of the embodiment can also be applied to an automated driving vehicle. Therefore, according to the second embodiment, it is possible to perform control highly compatible with automated driving in addition to effects similar to those of the first embodiment.

Third Embodiment

A third embodiment will be described below. A driving assistance device according to the third embodiment is mounted on a two-wheeled vehicle on which a driver rides while wearing a helmet. FIG. 10 is a diagram showing a device mounted in a two-wheeled vehicle MB centered on a driving assistance device 100B according to the third embodiment. The driving assistance device 100B is different from the driving assistance device 100 of the first embodiment in that a wireless communication device 80 is provided instead of controlling the speaker 60. The driving assistance device 100B instructs a wireless communication device 80 to transmit instruction information about the notification sound. The wireless communication device 80 performs communication on the basis of a communication standard such as Bluetooth (registered trademark).

A receiver 310, a left-ear speaker 320-L, and a right-ear speaker 320-R are attached to the helmet 300 worn by the driver. One or more sub-speakers at least in front of and behind the head may be provided on the helmet 300. As surround speakers, a plurality of sub-speakers may be provided to surround the head so that a surround sound can be provided within the helmet 300.

The driving assistance device 100B decides on a notification sound corresponding to the state and the surrounding situation of the two-wheeled vehicle MB by performing a process similar to that described in the first embodiment and causes the wireless communication device 80 to transmit instruction information for outputting a notification sound to the left-ear speaker 320-L and/or the right-ear speaker 320-R as it is. The receiver 310 causes one or more of the left-ear speaker 320-L, the right-ear speaker 320-R, and the sub-speakers to output the notification sound on the basis of the instruction information received from the wireless communication device 80. In the third embodiment, earphones with a wireless function or the like may be used instead of the speakers provided inside of the helmet.

Although the degree of freedom of sound image localization is reduced to some extent according to the third embodiment described above, effects similar to those of the first embodiment can be obtained in other respects.

The embodiment described above can be represented as follows.

A driving assistance device including:
a storage medium storing computer-readable instructions; and
a processor connected to the storage medium, the processor executing the computer-readable instructions to:
recognize a surrounding situation of a mobile object;
decide whether or not to prompt a driver of the mobile object to perform acceleration or deceleration on the basis of the recognized surrounding situation; and
cause a speaker to output a notification sound for prompting the driver of the mobile object to perform the acceleration or deceleration on the basis of a decision result,
wherein the notification sound is a notification sound obtained by continuously changing a structure of a sound.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A driving assistance device comprising:
a recognizer configured to recognize a surrounding situation of a mobile object;
a decider configured to decide whether or not to prompt a driver of the mobile object to perform acceleration or deceleration on the basis of the surrounding situation; and
a notification controller configured to cause a speaker to output a notification sound for prompting the driver of the mobile object to perform the acceleration or deceleration on the basis of a decision result,
wherein the notification sound is a notification sound obtained by continuously changing a structure of a sound,
wherein the notification controller causes the speaker to output the notification sound when a difference between a speed of the mobile object and a target speed is greater than or equal to a threshold value, and
determines whether or not to continuously output the notification sound in accordance with the surrounding situation of the mobile object when the difference between the speed of the mobile object and the target speed is less than the threshold value,
wherein the notification controller causes the notification sound to be continuously output even if the difference between the speed of the mobile object and the target speed is less than the threshold value when the mobile object is traveling in a specific road segment where the speed of the mobile object is predicted to change,
wherein the specific road segment includes a merging segment, and
wherein the notification controller ends an output of the notification sound when the mobile object has completed merging from a merging lane in the merging segment into a main lane.

2. The driving assistance device according to claim 1, wherein the notification controller causes the speaker to output notification sounds obtained by differentiating a structure of a continuously changing sound when the mobile object is accelerated and when the mobile object is decelerated.

3. The driving assistance device according to claim 1, wherein the notification controller causes the speaker to output a notification sound having a structure in which a frequency or pitch of a sound is continuously changed greatly or slightly.

4. The driving assistance device according to claim 3, wherein the notification controller changes the frequency or pitch in accordance with a degree of deviation between a speed of the mobile object and a target speed.

5. The driving assistance device according to claim 3, wherein the notification controller changes a period of the notification sound to be iteratively output in accordance with a degree of deviation between a speed of the mobile object and a target speed.

6. The driving assistance device according to claim 1,
wherein a plurality of speakers are provided in the mobile object, and
wherein the notification controller controls output processes of the plurality of speakers so that a sound image of the notification sound moves from the rear to the front of the driver or from the front to the rear of the driver in accordance with a case where the mobile object is accelerated and a case where the mobile object is decelerated.

7. The driving assistance device according to claim 1, wherein the notification controller ends an output of the notification sound when the difference between the speed of the mobile object and the target speed is less than the threshold value and when the mobile object is not traveling in the specific road segment.

8. The driving assistance device according to claim 1, wherein the notification controller causes the speaker to output a notification sound different from the notification sound when the difference between the speed of the mobile object and the target speed is less than the threshold value after the notification sound is output.

9. The driving assistance device according to claim 1, wherein the notification controller determines whether or not to end the notification sound on the basis of content set by the driver when the difference between the speed of the mobile object and the target speed is less than the threshold value in a state in which the notification sound has been output.

10. The driving assistance device according to claim 1, wherein the notification controller causes the output of the notification sound to end by receiving an end instruction from the driver when the difference between the speed of the mobile object and the target speed is less than the threshold value in a state in which the notification sound has been output.

11. The driving assistance device according to claim 1, further comprising a learner configured to learn a notification sound preferred by the driver on the basis of a previously output notification sound and a result of guiding the mobile object of the driver after the notification,
wherein the notification controller causes the speaker to output the notification sound learned by the learner in advance and associated with the driver when the difference between the speed of the mobile object and the target speed is less than the threshold value.

12. A driving assistance method comprising:
recognizing, by a computer, a surrounding situation of a mobile object;
deciding, by the computer, whether or not to prompt a driver of the mobile object to perform acceleration or deceleration on the basis of the recognized surrounding situation; and
causing, by the computer, a speaker to output a notification sound for prompting the driver of the mobile object to perform the acceleration or deceleration on the basis of a decision result,
wherein the notification sound is a notification sound obtained by continuously changing a structure of a sound,
causing, by the computer, the speaker to output the notification sound when a difference between a speed of the mobile object and a target speed is greater than or equal to a threshold value;
determining, by the computer, whether or not to continuously output the notification sound in accordance with the surrounding situation of the mobile object when the difference between the speed of the mobile object and the target speed is less than the threshold value;
causing, by the computer, the notification sound to be continuously output even if the difference between the speed of the mobile object and the target speed is less than the threshold value when the mobile object is traveling in a specific road segment where the speed of the mobile object is predicted to change,
wherein the specific road segment includes a merging segment, and
ending, by the computer, an output of the notification sound when the mobile object has completed merging from a merging lane in the merging segment into a main lane.

13. A computer-readable non-transitory storage medium storing a program for causing a computer to:
recognize a surrounding situation of a mobile object;
decide whether or not to prompt a driver of the mobile object to perform acceleration or deceleration on the basis of the recognized surrounding situation; and
cause a speaker to output a notification sound for prompting the driver of the mobile object to perform the acceleration or deceleration on the basis of a decision result,
wherein the notification sound is a notification sound obtained by continuously changing a structure of a sound,
cause the speaker to output the notification sound when a difference between a speed of the mobile object and a target speed is greater than or equal to a threshold value;
determine whether or not to continuously output the notification sound in accordance with the surrounding situation of the mobile object when the difference between the speed of the mobile object and the target speed is less than the threshold value;
cause the notification sound to be continuously output even if the difference between the speed of the mobile object and the target speed is less than the threshold value when the mobile object is traveling in a specific road segment where the speed of the mobile object is predicted to change,
wherein the specific road segment includes a merging segment, and
end an output of the notification sound when the mobile object has completed merging from a merging lane in the merging segment into a main lane.

* * * * *